US009769304B2

(12) United States Patent
Lin

(10) Patent No.: US 9,769,304 B2
(45) Date of Patent: Sep. 19, 2017

(54) PLAYER TERMINAL CONTROLLING METHOD AND PLAYER TERMINAL

(71) Applicant: GUANG DONG OPPO MOBILE TELECOMMUNICATIONS CORP., LTD., Dongguan, Guangdong (CN)

(72) Inventor: Shangbo Lin, Dongguan (CN)

(73) Assignee: GUANG DONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/191,526

(22) Filed: Jun. 24, 2016

(65) Prior Publication Data

US 2017/0013109 A1 Jan. 12, 2017

Related U.S. Application Data

(63) Continuation of application No. PCT/CN2015/096062, filed on Nov. 30, 2015.

(30) Foreign Application Priority Data

Jul. 9, 2015 (CN) .......................... 2015 1 0405943

(51) Int. Cl.
  *H04L 29/08* (2006.01)
  *H04M 1/725* (2006.01)

(52) U.S. Cl.
  CPC .... *H04M 1/72533* (2013.01); *H04M 1/72558* (2013.01); *H04M 1/72566* (2013.01)

(58) Field of Classification Search
  CPC ............ G06Q 30/0269; G06Q 30/0201; H04L 67/22; H04L 67/306; H04L 51/24; H04M 3/42365; H04M 19/04; H04M 3/4365; H04W 4/027; H04W 4/16
  USPC ................... 455/517, 420; 709/206; 715/810
  See application file for complete search history.

(56) References Cited

U.S. PATENT DOCUMENTS

| | | | | |
|---|---|---|---|---|
| 2013/0332884 A1* | 12/2013 | Hitosuga | ............... | G06F 3/0482 715/810 |
| 2015/0350146 A1* | 12/2015 | Cary | ....................... | H04W 4/22 709/206 |

* cited by examiner

*Primary Examiner* — Phuoc H Doan
(74) *Attorney, Agent, or Firm* — Hauptman Ham, LLP

(57) ABSTRACT

A player terminal controlling method includes receiving a do not disturb setting instruction transmitted from a target control terminal, which carries a time period and an identity of the target control terminal; setting a do not disturb time period as the time period and setting an identity of an authorized control terminal as the identity of the target control terminal within the do not disturb time period; determining whether an identity of a control terminal is identical to the identity of the authorized control terminal; and executing an operation corresponding to the control instruction when the identity of the control terminal is identical to the identity of the authorized control terminal. As can be seen, the present disclosure can increase the ability of a user terminal to take exclusive control of the player terminal at a specific time period.

20 Claims, 10 Drawing Sheets

PLAYER TERMINAL CONTROLLING METHOD AND PLAYER TERMINAL

CROSS-REFERENCE TO RELATED APPLICATIONS

This application is a continuation application of PCT Application No. PCT/CN2015/096062, filed on Nov. 30, 2015, which claims priority to Chinese patent application No. 201510405943.7, filed on Jul. 9, 2015, the content of which are incorporated herein by reference in their entirety.

TECHNICAL FIELD OF THE DISCLOSURE

The present disclosure relates to electronic technology, and more particularly, to a player terminal controlling method and a player terminal.

BACKGROUND OF THE DISCLOSURE

As with the development of a player terminal, more and more users establish a connection between a mobile phone and the player terminal and use the mobile phone to control the player terminal to play music. In the existing skills, one single player terminal can be connected to a plurality of mobile phones at the same time and each of the mobile phones connected to the player terminal is able to control the player terminal. Therefore, in real life, all the members in a family can use their own mobile phones to control a same player terminal. However, a user sometimes wants a certain player terminal be controlled only by himself/herself at a specific time period. For instance, a user A wants to read a book in a study from 9 P.M. to 10 P.M. but does not want the player terminal in the study be controlled by other users from 9 P.M. to 10 P.M. It may cause a great deal of trouble to the user A if other users control the player terminal in the study to play music when the user A reads the book in the study from 9 P.M. to 10 P.M. Therefore, how to increase the ability of a user terminal to take exclusive control of the player terminal at a specific time period is a problem required to be solve.

BRIEF DESCRIPTION OF THE DRAWINGS

To illustrate the technical solutions in the embodiments of the present disclosure more clearly, the following briefly introduces the accompanying drawings required for describing the embodiments of the present disclosure. Apparently, the accompanying drawings in the following description show some embodiments of the present disclosure, and a person of ordinary skill in the art may still derive other drawings from these accompanying drawings without creative efforts.

DETAILED DESCRIPTION OF THE DISCLOSURE

Figure 1:
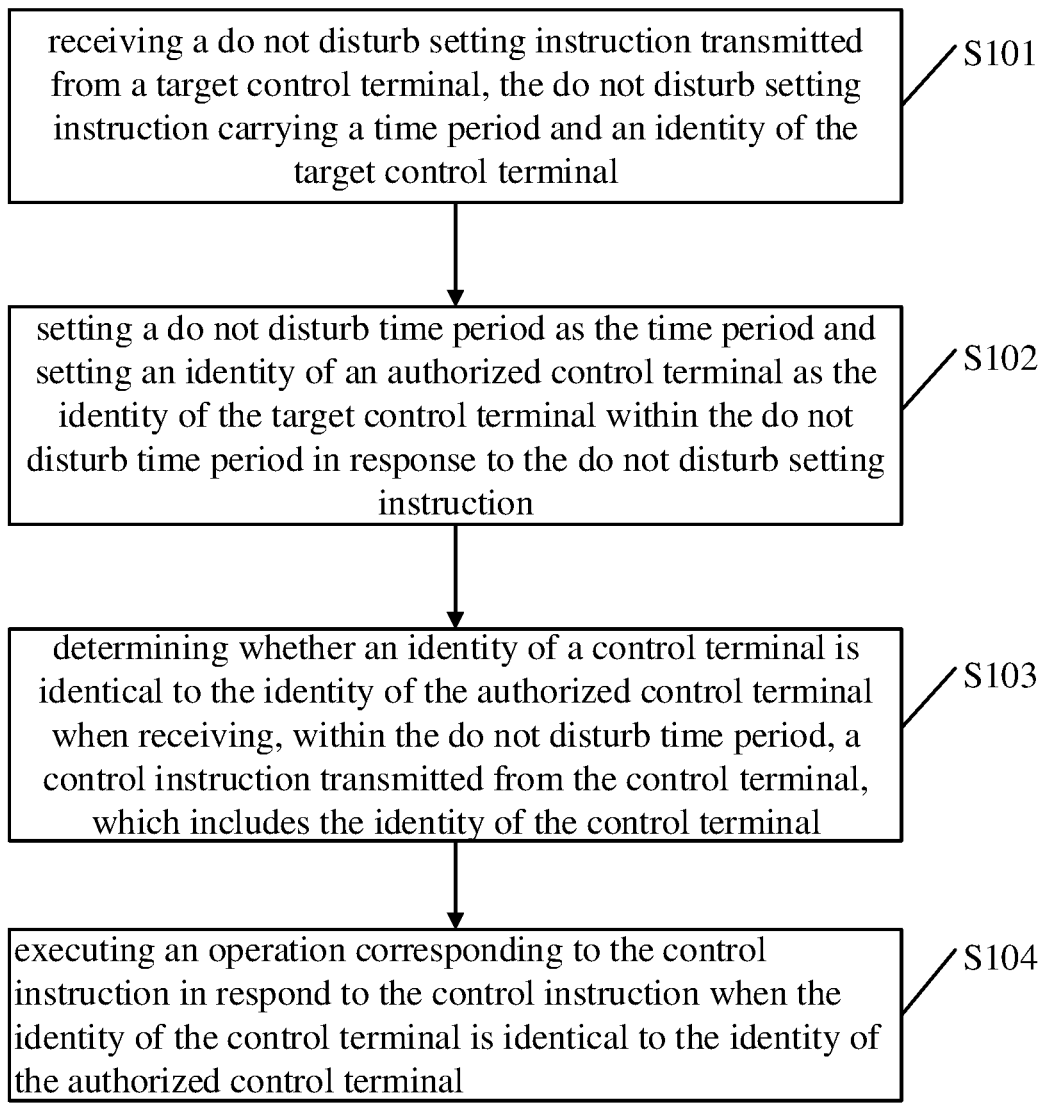
FIG. 1 is a schematic flow chart of a player terminal controlling method disclosed in an embodiment of the present disclosure.

The technical solutions in the embodiments of the present disclosure will be clearly and completely described in the following with reference to the accompanying drawings. It is obvious that the embodiments to be described are a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a player terminal controlling method and a player terminal capable of increasing the ability of a user terminal to take exclusive control of the player terminal at a specific time period. It will be separately described detailedly in the following.

The embodiments of the present disclosure discloses a player terminal controlling method and a player terminal capable of increasing the ability of a user terminal to take exclusive control of the player terminal at a specific time period.

At least one embodiment of the present disclosure discloses a player terminal controlling method. The method can include: receiving a do not disturb setting instruction transmitted from a target control terminal, the do not disturb setting instruction carrying a time period and an identity of the target control terminal; setting a do not disturb time period as the time period and setting an identity of an authorized control terminal as the identity of the target control terminal within the do not disturb time period in response to the do not disturb setting instruction; determining whether an identity of a control terminal is identical to the identity of the authorized control terminal when receiving, within the do not disturb time period, a control instruction transmitted from the control terminal, which includes the identity of the control terminal; and executing an operation corresponding to the control instruction in response to the control instruction when the identity of the control terminal is identical to the identity of the authorized control terminal.

In at least one embodiment of the present disclosure, the method further includes: determining whether execution time of the operation corresponding to the control instruction is within the do not disturb time period when the identity of the control terminal is not identical to the identity of the authorized control terminal; and executing the operation corresponding to the control instruction at the execution time if the execution time is not within the do not disturb time period.

In at least one embodiment of the present disclosure, after setting the do not disturb time period as the time period and setting the identity of the authorized control terminal as the identity of the target control terminal within the do not disturb time period in response to the do not disturb setting instruction, the method further includes: detecting whether a target control instruction exists, the target control instruction being received before a start time of the do not disturb time period and execution time of an operation corresponding to the target control instruction being within the do not disturb time period; and prohibiting executing the operation corresponding to the target control instruction within the do not disturb time period if the target control instruction exists.

In at least one embodiment of the present disclosure, the method further includes: transmitting a prompt message to the control terminal for indicating that the player terminal is unavailable within the do not disturb time period when the identity of the control terminal is not identical to the identity of the authorized control terminal.

In at least one embodiment of the present disclosure, after transmitting the prompt message to the control terminal for indicating that the player terminal is unavailable within the do not disturb time period when the identity of the control terminal is not identical to the identity of the authorized control terminal, the method further includes: receiving a control permission request transmitted from the control terminal; transmitting, in response to the control permission request, a prompt message to the authorized control terminal for asking whether to allow the control terminal to control the player terminal within the do not disturb time period; receiving a control permitted instruction transmitted, in response to the prompt message, from the authorized control terminal; and setting the identity of the authorized control terminal within the do not disturb time period as the identity of the control terminal in response to the control permitted instruction.

In at least one embodiment of the present disclosure, the first possible implementation scheme of the first aspect, the second possible implementation scheme of the first aspect, the third possible implementation scheme of the first aspect, or the fourth possible implementation scheme of the first aspect, the control instruction includes a scene control instruction, which is configured to control all the player terminals included in a target scene to execute a same target operation, the target scene including one or more player terminals.

In at least one embodiment of the present disclosure, the first possible implementation scheme of the first aspect, the second possible implementation scheme of the first aspect, the third possible implementation scheme of the first aspect, or the fourth possible implementation scheme of the first aspect, after receiving the do not disturb setting instruction transmitted from the target control terminal, the method further includes: determining whether a stop time of the time period carried by the do not disturb setting instruction is after current time; and executing, when the stop time is after the current time, setting the do not disturb time period as the time period and setting the identity of the authorized control terminal as the identity of the target control terminal within the do not disturb time period in response to the do not disturb setting instruction.

At least one embodiment of the present disclosure discloses a player terminal. The player terminal can include: a receiving unit configured to receive a do not disturb setting instruction transmitted from a target control terminal, the do not disturb setting instruction carrying a time period and an identity of the target control terminal; a setting unit configured to set a do not disturb time period as the time period and setting an identity of an authorized control terminal as the identity of the target control terminal within the do not disturb time period in response to the do not disturb setting instruction; a first determining unit configured to determine whether an identity of a control terminal is identical to the identity of the authorized control terminal when receiving, within the do not disturb time period, a control instruction transmitted from the control terminal, which includes the identity of the control terminal; and an executing unit configured to execute an operation corresponding to the control instruction in response to the control instruction when the first determining unit determines that the identity of the control terminal is identical to the identity of the authorized control terminal.

In at least one embodiment of the present disclosure, the player terminal further includes: a second determining unit configured to determine whether execution time of the operation corresponding to the control instruction is within the do not disturb time period when the first determining unit determines that the identity of the control terminal is not identical to the identity of the authorized control terminal; and the executing unit further configured to execute the operation corresponding to the control instruction at the execution time when the second determining unit determines that the execution time is not within the do not disturb time period.

In at least one embodiment of the present disclosure, the player terminal further includes: a detecting unit configured to detect, after setting the do not disturb time period as the time period and setting the identity of the authorized control terminal as the identity of the target control terminal within the do not disturb time period in response to the do not disturb setting instruction, whether a target control instruction exists, the target control instruction being received before a start time of the do not disturb time period and execution time of an operation corresponding to the target control instruction being within the do not disturb time period; and a control unit configured to prohibit executing the operation corresponding to the target control instruction within the do not disturb time period when the target control instruction is detected by the detecting unit.

In at least one embodiment of the present disclosure, the player terminal further includes: a transmitting unit configured to transmit a prompt message to the control terminal for indicating that the player terminal is unavailable within the do not disturb time period when the first determining unit determines that the identity of the control terminal is not identical to the identity of the authorized control terminal.

In at least one embodiment of the present disclosure, the receiving unit further configured to receive, after the transmitting unit transmits the prompt message to the control terminal for indicating that the player terminal is unavailable within the do not disturb time period, a control permission request transmitted from the control terminal; the transmitting unit further configured to transmit, in response to the control permission request, a prompt message to the authorized control terminal for asking whether to allow the control terminal to control the player terminal within the do not disturb time period; the receiving unit further configured to receive a control permitted instruction transmitted, in response to the prompt message, from the authorized control terminal; and the setting unit further configured to set the identity of the authorized control terminal within the do not disturb time period as the identity of the control terminal in response to the control permitted instruction.

In at least one embodiment of the present disclosure, the first possible implementation scheme of the second aspect, the second possible implementation scheme of the second aspect, the third possible implementation scheme of the second aspect, or the fourth possible implementation scheme of the second aspect, the control instruction includes a scene control instruction, which is configured to control all the player terminals included in a target scene to execute a same target operation, the target scene including one or more player terminals.

In at least one embodiment of the present disclosure, the first possible implementation scheme of the second aspect, the second possible implementation scheme of the second aspect, the third possible implementation scheme of the second aspect, or the fourth possible implementation scheme of the second aspect, the player terminal further includes: a third determining unit configured to determine, after the receiving unit receives the do not disturb setting instruction transmitted from the target control terminal, whether a stop time of the time period carried by the do not disturb setting instruction is after current time; and the setting unit being triggered, when the third determining unit determines that the stop time is after the current time, to execute setting the do not disturb time period as the time period and setting the identity of the authorized control terminal as the identity of the target control terminal within the do not disturb time period in response to the do not disturb setting instruction.

In at least one embodiment of the present disclosure, after the player terminal receives a do not disturb setting instruction transmitted from a target control terminal, the player terminal sets a do not disturb time period as a time period carried by the do not disturb setting instruction and sets an identity of an authorized control terminal within the do not disturb time period as an identity of the target control terminal carried by the do not disturb setting instruction, in response to the do not disturb setting instruction; the player terminal determines whether an identity of a control terminal is identical to the identity of the authorized control terminal when receiving, within the do not disturb time period, a control instruction transmitted from the control terminal, which includes the identity of the control terminal; the player terminal executes an operation corresponding to the control instruction in response to the control instruction when the identity of the control terminal is identical to the identity of the authorized control terminal. As can be seen, carrying out the embodiment of the present disclosure can increase the ability of a user terminal to take exclusive control of the player terminal at a specific time period.

At least one embodiment of the present disclosure discloses a player terminal. The player terminal can include: one or more processors, a storage, and one or more units, said one or more units being stored in the storage and performing the following operations when executed by said one or more processors: receiving a do not disturb setting instruction transmitted from a target control terminal, the do not disturb setting instruction carrying a time period and an identity of the target control terminal; setting a do not disturb time period as the time period and setting an identity of an authorized control terminal as the identity of the target control terminal within the do not disturb time period in response to the do not disturb setting instruction; determining whether an identity of a control terminal is identical to the identity of the authorized control terminal when receiving, within the do not disturb time period, a control instruction transmitted from the control terminal, which includes the identity of the control terminal; and executing an operation corresponding to the control instruction in response to the control instruction when the identity of the control terminal is identical to the identity of the authorized control terminal.

At least one embodiment of the present disclosure discloses a storage medium configured to store an application program, which is configured to execute the player terminal controlling method according the first aspect of the embodiments of the present disclosure.

Please refer to FIG. 1, which is a schematic flow chart of a player terminal controlling method disclosed in an embodiment of the present disclosure. As shown in FIG. 1, the player terminal controlling method may begin at block S101.

At block S101, a do not disturb setting instruction transmitted from a target control terminal is received, and the do not disturb setting instruction carries a time period and an identity of the target control terminal.

In at least one embodiment of the present disclosure, the player terminal receives a do not disturb setting instruction transmitted from a target control terminal. The do not disturb setting instruction carries a time period and an identity of the target control terminal. The player terminal may include a user terminal having a playing function, such as a smart audio equipment, a smart phone, a smart television, a palmtop computer, a laptop computer, and a desktop computer, but is not limited thereto. The target control terminal may include a user terminal such as a smart phone, a tablet, a laptop computer, and a desktop computer, but is not limited thereto. The operating systems of the player terminal and the target control terminal may include but is not limited to Android Operating System, IOS Operating System, Symbian Operating System, Black Berry Operating System, and WP8 (Windows Phone 8) Operating System, and the embodiment of the present disclosure is not limited thereto.

In at least one embodiment of the present disclosure, a connection is established between the player terminal and the target control terminal before the player terminal receives the do not disturb setting instruction transmitted from the target control terminal. In at least one embodiment of the present disclosure, a wireless WIFI connection or Bluetooth connection may be established between the player terminal and the target control terminal.

In at least one embodiment of the present disclosure, the identity of the target control terminal is a message that can be used to identify the target control terminal. The identity of the target control terminal may include but is not limited to MAC (Media Access Control) address of the target control terminal.

In at least one embodiment of the present disclosure, the time period carried by the do not disturb setting instruction may be 9:00 to 10:00 or 11:00 to 12:00, for instance.

At block S102, a do not disturb time period is set as the time period and an identity of an authorized control terminal is set as the identity of the target control terminal within the do not disturb time period in response to the do not disturb setting instruction.

In at least one embodiment of the present disclosure, after the player terminal receives the do not disturb setting instruction, a do not disturb time period is set as the time period carried by the do not disturb setting instruction and an identity of an authorized control terminal within the do not disturb time period is set as the identity of the target control terminal carried by the do not disturb setting instruction, in response to the do not disturb setting instruction.

At block S103, whether an identity of a control terminal is identical to the identity of the authorized control terminal is determined when a control instruction transmitted from the control terminal, which includes the identity of the control terminal, is received within the do not disturb time period.

In at least one embodiment of the present disclosure, the player terminal determines whether an identity of a control terminal is identical to the identity of the authorized control terminal within the do not disturb time period when the player terminal receives, within the do not disturb time period, a control instruction transmitted from the control terminal, which includes the identity of the control terminal. Block S104 will be executed if the identity of the control terminal is identical to the identity of the authorized control terminal; in at least one embodiment of the present disclosure, the player terminal prohibits executing the control instruction if they are not identical.

In at least one embodiment of the present disclosure, the control instruction includes a scene control instruction, which is configured to control all the player terminals included in a target scene including one or more player terminals to execute a same target operation. The target operation can be a playing operation, a volume adjusting operation, or a turning-off operation, and the embodiment of the present disclosure is not limited thereto.

For instance, it is assumed that the target scene includes a present player terminal and a player terminal A, and the target operation is to play a predetermined song. Then, the scene control instruction is configured to control both of the present player terminal and the player terminal A to play the predetermined song. When the present player terminal determines that the identity of the control terminal is not identical to the identity of the authorized control terminal within the do not disturb time period, the present player terminal will not execute the target operation corresponding to the scene control instruction. However, the player terminal A is not affected, and will execute, in response to the scene control instruction, the target operation corresponding to the scene control instruction.

At block S104, an operation corresponding to the control instruction is executed in response to the control instruction when the identity of the control terminal is identical to the identity of the authorized control terminal.

In at least one embodiment of the present disclosure, the player terminal executes, in response to the control instruction, the operation corresponding to the control instruction when the player terminal determines that the identity of the control terminal is identical to the identity of the authorized control terminal.

In at least one embodiment of the present disclosure, the operation corresponding to the control instruction can be a playing operation or a volume adjusting operation for a predetermined song, and the embodiment of the present disclosure is not limited thereto.

In the method illustrated in FIG. 1, after the player terminal receives a do not disturb setting instruction transmitted from a target control terminal, the player terminal sets a do not disturb time period as a time period carried by the do not disturb setting instruction and sets an identity of an authorized control terminal within the do not disturb time period as an identity of the target control terminal carried by the do not disturb setting instruction, in response to the do not disturb setting instruction; the player terminal determines whether an identity of a control terminal is identical to the identity of the authorized control terminal when receiving, within the do not disturb time period, a control instruction transmitted from the control terminal, which includes the identity of the control terminal; the player terminal executes an operation corresponding to the control instruction in response to the control instruction when the identity of the control terminal is identical to the identity of the authorized control terminal. When they are not identical, the player terminal may prohibit executing the operation corresponding to the control instruction. As can be seen, carrying out the embodiment of the present disclosure can make the player terminal be controlled only by a specified user terminal within a selected time period. This increases the ability of a user terminal to take exclusive control of the player terminal at the selected time period.

Figure 2:
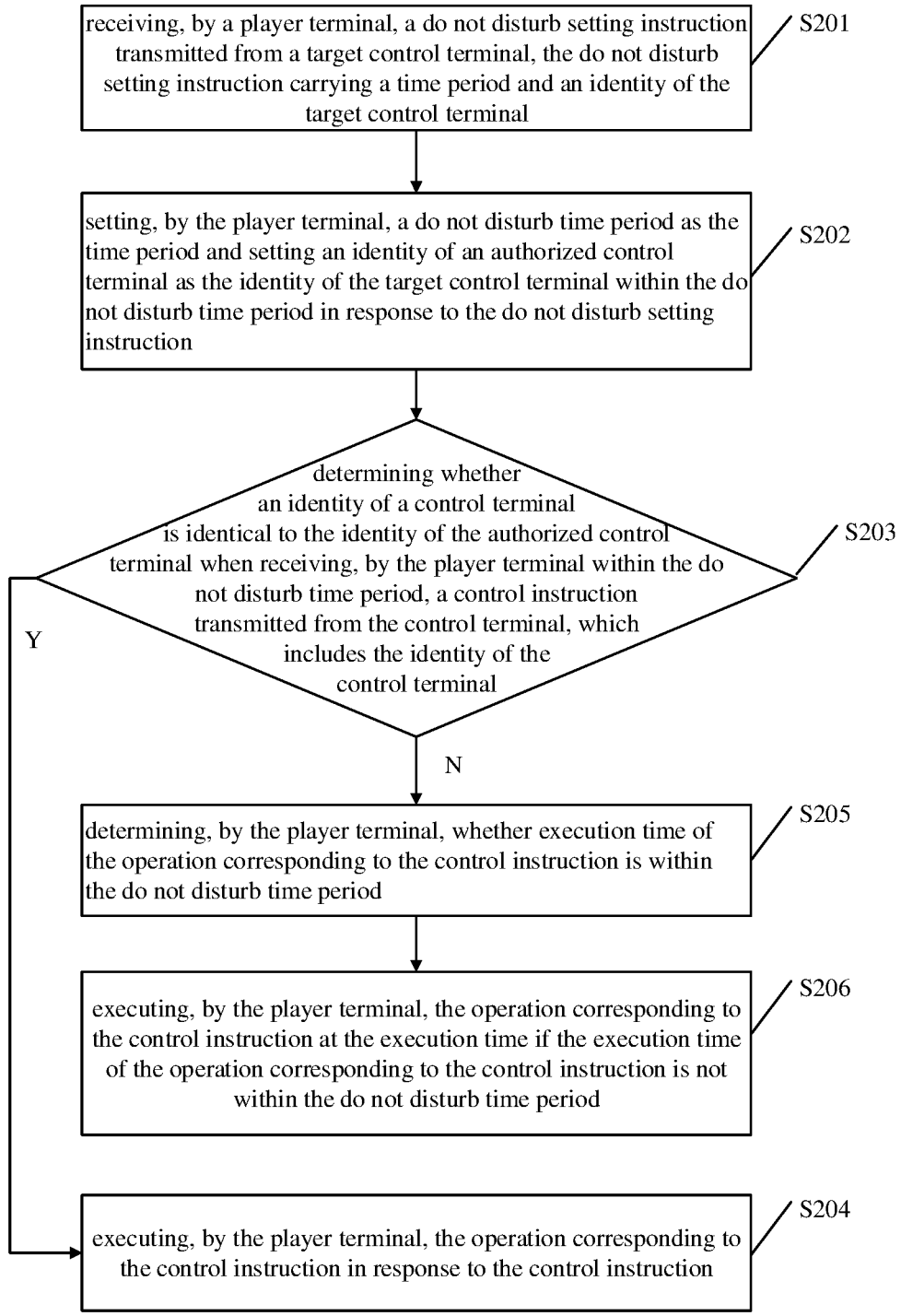
FIG. 2 is a schematic flow chart of another player terminal controlling method disclosed in an embodiment of the present disclosure.

Please refer to FIG. 2, which is a schematic flow chart of another player terminal controlling method disclosed in an embodiment of the present disclosure. As shown in FIG. 2, the player terminal controlling method may begin at block S201.

At block S201, a do not disturb setting instruction transmitted from a target control terminal is received by a player terminal, and the do not disturb setting instruction carries a time period and an identity of the target control terminal.

At block S202—a do not disturb time period is set by the player terminal as the time period and an identity of an authorized control terminal is set as the identity of the target control terminal within the do not disturb time period in response to the do not disturb setting instruction.

At block S203, whether an identity of a control terminal is identical to the identity of the authorized control terminal is determined when a control instruction transmitted from the control terminal, which includes the identity of the control terminal, is received by the player terminal within the do not disturb time period.

In at least one embodiment of the present disclosure, the player terminal determines whether an identity of a control terminal is identical to the identity of the authorized control terminal within the do not disturb time period when the player terminal receives, within the do not disturb time period, a control instruction transmitted from the control terminal, which includes the identity of the control terminal. Block S204 will be executed if the identity of the control terminal is identical to the identity of the authorized control terminal; block S205 will be executed if they are not identical.

At block S204, the operation corresponding to the control instruction is executed by the player terminal in response to the control instruction.

At block S205, whether execution time of the operation corresponding to the control instruction is within the do not disturb time period is determined by the player terminal.

In at least one embodiment of the present disclosure, the player terminal determines whether execution time of the operation corresponding to the control instruction is within the do not disturb time period if the player terminal determines that the identity of the control terminal is not identical to the identity of the authorized control terminal within the do not disturb time period. Block S206 will be executed if the execution time of the operation corresponding to the control instruction is not within the do not disturb time period. The player terminal prohibits executing the control instruction if the execution time of the operation corresponding to the control instruction is within the do not disturb time period.

In a practical application, the control instruction received by the player terminal may be an instruction configured to execute a certain operation at a specified time. For example, the player terminal may receive at 10:00 a control instruction configured to play a predetermined song at 12:00. That is, the execution time of the operation corresponding to the control instruction is 12:00. For instance, it is assumed that the do not disturb time period is between 9:00 and 11:00 and the player terminal receives at 10:00 a control instruction transmitted from the control terminal, the execution time of which is 12:00. If the player terminal determines that the identity of the control terminal included in the control instruction is not identical to the identity of the authorized control terminal within the do not disturb time period, the player terminal determines whether the execution time (i.e., 12:00) of the operation corresponding to the control instruction is within the do not disturb time period (i.e., 9:00 to 11:00). As can be seen, in this case, the execution time (i.e., 12:00) of the operation corresponding to the control instruction is not within the do not disturb time period (i.e., 9:00 to 11:00), and the player terminal will execute block 206.

At block S206, the operation corresponding to the control instruction is executed by the player terminal at the execution time if the execution time of the operation corresponding to the control instruction is not within the do not disturb time period.

In at least one embodiment of the present disclosure, the player terminal executes the operation corresponding to the control instruction at the execution time of the operation corresponding to the control instruction if the player terminal determines that the execution time of the operation corresponding to the control instruction is not within the do not disturb time period.

In the method illustrated in FIG. 2, the player terminal determines whether an identity of a control terminal is identical to the identity of the authorized control terminal when the player terminal receives, within the do not disturb time period, a control instruction transmitted from the control terminal, which includes the identity of the control terminal; when the identity of the control terminal is identical to the identity of the authorized control terminal, the player terminal executes an operation corresponding to the control instruction in response to the control instruction; when they are not identical, the player terminal determines whether execution time of the operation corresponding to the control instruction is within the do not disturb time period; the player terminal executes the operation corresponding to the control instruction at the execution time if the player terminal determines that the execution time of the operation corresponding to the control instruction is not within the do not disturb time period. If the player terminal determines that the execution time of the operation corresponding to the control instruction is within the do not disturb time period, the player terminal prohibits executing the control instruction. As can be seen, carrying out the embodiment of the present disclosure can make the player terminal be controlled only by a specified user terminal within a certain time period. This increases the ability of a user terminal to take exclusive control of the player terminal at a specific time period.

Figure 3:
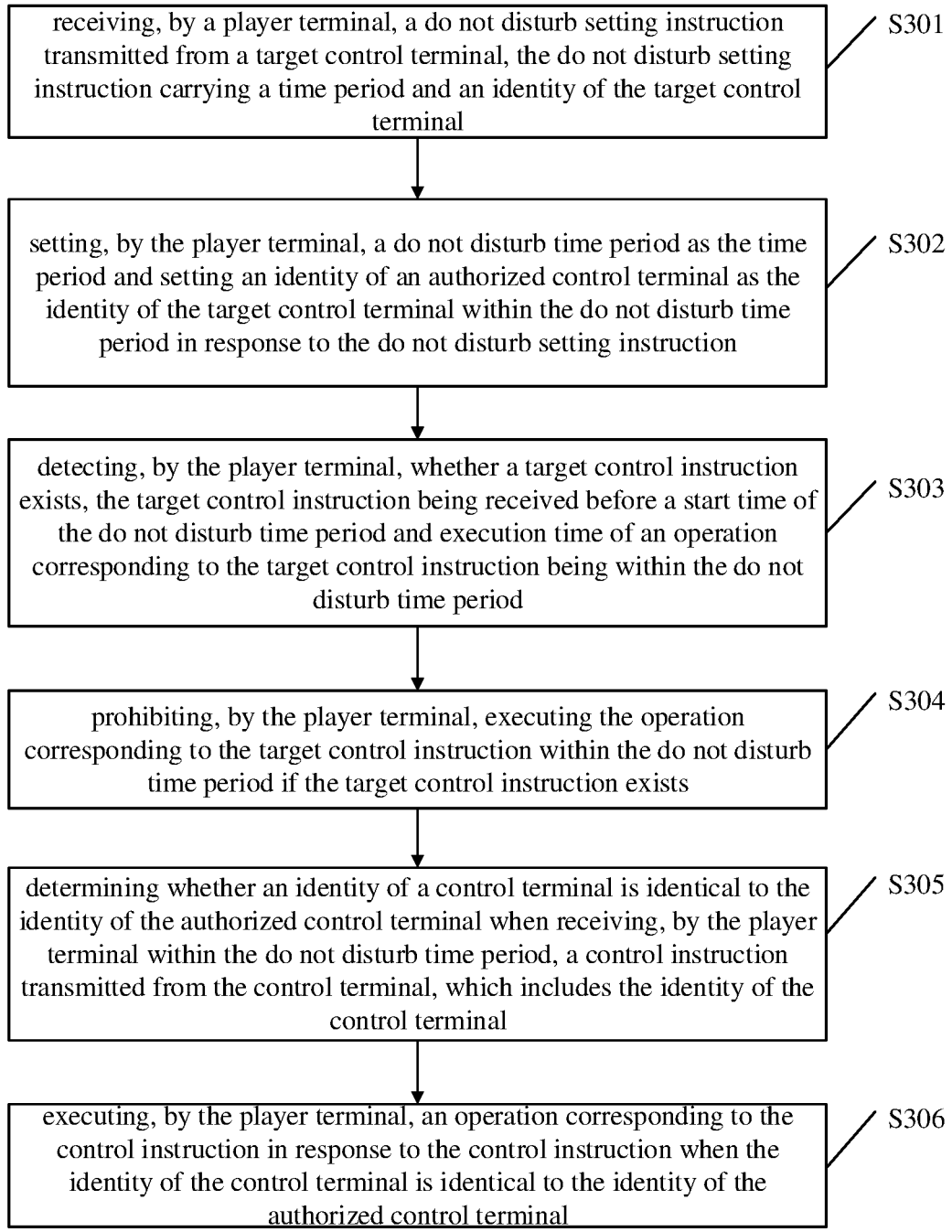
FIG. 3 is a schematic flow chart of another player terminal controlling method disclosed in an embodiment of the present disclosure.

Please refer to FIG. 3, which is a schematic flow chart of another player terminal controlling method disclosed in an embodiment of the present disclosure. As shown in FIG. 3, the player terminal controlling method may begin at block S301.

At block S301, a do not disturb setting instruction transmitted from a target control terminal is received by a player terminal, and the do not disturb setting instruction carries a time period and an identity of the target control terminal.

At block S302, a do not disturb time period is set by the player terminal as the time period and an identity of an authorized control terminal is set as the identity of the target control terminal within the do not disturb time period in response to the do not disturb setting instruction.

At block S303, whether a target control instruction exists is detected by the player terminal, and the target control instruction is received before a start time of the do not disturb time period and execution time of an operation corresponding to the target control instruction is within the do not disturb time period.

In at least one embodiment of the present disclosure, after the player terminal sets the do not disturb time period as the time period and sets the identity of the authorized control terminal as the identity of the target control terminal within the do not disturb time period in response to the do not disturb setting instruction, the player terminal detects whether a target control instruction exists, in which the target control instruction is received before a start time of the do not disturb time period and execution time of an operation corresponding to the target control instruction is within the do not disturb time period. If it exists, execute block S304; if it does not exist, continue to detect, after the start time of the do not disturb time period, whether the target control instruction exists. When the stop time of the do not disturb time period is arrived, stop detecting whether the target control instruction exists.

In a practical application, before the start time of the do not disturb time period, the player terminal may receive a control instruction configured to execute a certain operation within the do not disturb time period. For example, it is assumed that the do not disturb time period is between 11:00 and 13:00 and the player terminal receives at 10:00 a control instruction A configured to play a predetermined song at 12:00. That is, the execution time of the operation corresponding to the control instruction A is 12:00. After the player terminal sets the do not disturb time period as 11:00 to 13:00 and sets the identity of the authorized control terminal within 11:00 to 13:00 as the identity of the target control terminal, the player terminal will detect whether there exists a control instruction having execution time of a corresponding operation within 11:00 to 13:00. In this case, the player terminal will determine the control instruction A as the target control instruction.

At block S304, executing the operation corresponding to the target control instruction within the do not disturb time period is prohibited by the player terminal if the target control instruction exists.

At block S305, whether an identity of a control terminal is identical to the identity of the authorized control terminal is determined when a control instruction transmitted from the control terminal, which includes the identity of the control terminal, is received by the player terminal within the do not disturb time period.

At block S306, an operation corresponding to the control instruction is executed by the player terminal in response to the control instruction when the identity of the control terminal is identical to the identity of the authorized control terminal.

In the method illustrated in FIG. 3, after the player terminal sets the do not disturb time period as the time period carried by the do not disturb setting instruction and sets the identity of the authorized control terminal within the do not disturb time period as the identity of the target control terminal carried by the do not disturb setting instruction, the player terminal will detect whether a target control instruction exists. If the target control instruction exits, the player terminal will prohibit executing the operation corresponding to the target control instruction within the do not disturb time period. Also, the player terminal determines whether an identity of a control terminal is identical to the identity of the authorized control terminal when receiving, within the do not disturb time period, a control instruction transmitted from the control terminal, which includes the identity of the control terminal; when the identity of the control terminal is identical to the identity of the authorized control terminal, the player terminal executes an operation corresponding to the control instruction in response to the control instruction; when they are not identical, the player terminal may prohibit executing the operation corresponding to the control instruction. As can be seen, carrying out the embodiment of the present disclosure can make the player terminal be controlled only by a specified user terminal within a certain time period. This increases the ability of a user terminal to take exclusive control of the player terminal at a certain time period.

Figure 4:
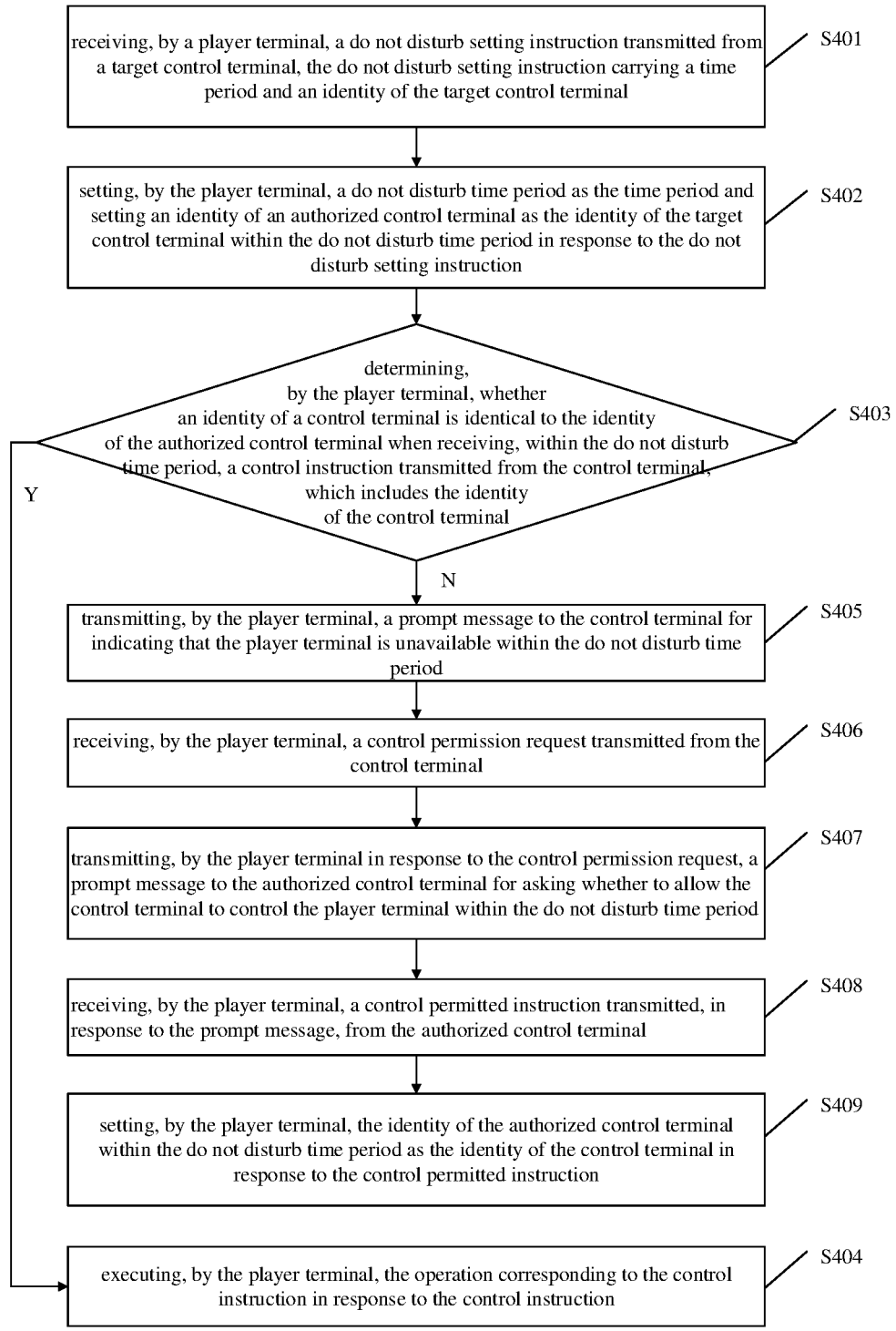
FIG. 4 is a schematic flow chart of another player terminal controlling method disclosed in an embodiment of the present disclosure.

Please refer to FIG. 4, which is a schematic flow chart of another player terminal controlling method disclosed in an embodiment of the present disclosure. As shown in FIG. 4, the player terminal controlling method may begin at block S401.

At block S401, a do not disturb setting instruction transmitted from a target control terminal is received by a player terminal, and the do not disturb setting instruction carries a time period and an identity of the target control terminal.

At block S402, a do not disturb time period as the time period is set by the player terminal and an identity of an authorized control terminal is set as the identity of the target control terminal within the do not disturb time period in response to the do not disturb setting instruction.

At block S403, whether an identity of a control terminal is identical to the identity of the authorized control terminal is determined by the player terminal when a control instruction transmitted from the control terminal, which includes the identity of the control terminal, is received within the do not disturb time period.

In at least one embodiment of the present disclosure, execute block S404 when the identity of the control terminal is identical to the identity of the authorized control terminal; execute block S405 when the identity of the control terminal is not identical to the identity of the authorized control terminal.

At block S404, the operation corresponding to the control instruction is executed by the player terminal in response to the control instruction.

At block S405, a prompt message is transmitted by the player terminal to the control terminal for indicating that the player terminal is unavailable within the do not disturb time period.

In at least one embodiment of the present disclosure, the player terminal transmits a prompt message to the control terminal for indicating that the player terminal is unavailable within the do not disturb time period when the player terminal determines that the identity of the control terminal is not identical to the identity of the authorized control terminal. In at least one embodiment of the present disclosure, after receiving the prompt message, the control terminal will output the prompt message to a user for indicating that the player terminal is unavailable within the do not disturb time period. For instance, it is assumed that the do not disturb time period is between 11:00 and 12:00. The control terminal may output a prompt message to a user for indicating that the player terminal is unavailable within 11:00 to 12:00. If the user still wants to control the player terminal after perceiving the prompt message outputted from the control terminal, the user may click a functional button on the control terminal to trigger the control terminal to transmit a control permission request to the player terminal.

At block S406, a control permission request transmitted is received by the player terminal from the control terminal.

At block S407, in response to the control permission request, a prompt message is transmitted by the player terminal to the authorized control terminal for asking whether to allow the control terminal to control the player terminal within the do not disturb time period.

In at least one embodiment of the present disclosure, after receiving the control permission request transmitted from the control terminal, the player terminal transmits, in response to the control permission request, a prompt message to the authorized control terminal for asking whether to allow the control terminal to control the player terminal within the do not disturb time period. A user may input, on the authorized control terminal, a control permitted instruction configured to allow the control terminal to control the player terminal within the do not disturb time period, or may input, on the authorized control terminal, a control prohibited instruction configured to prohibit the control instruction from controlling the player terminal within the do not disturb time period.

At block S408, a control permitted instruction transmitted, in response to the prompt message, from the authorized control terminal is received by the player terminal.

At block S409, the identity of the authorized control terminal within the do not disturb time period is set by the player terminal, as the identity of the control terminal in response to the control permitted instruction.

In at least one embodiment of the present disclosure, after the player terminal receives the control permitted instruction, the player terminal will sets the identity of the authorized control terminal within the do not disturb time period as the identity of the control terminal in response to the control permitted instruction.

In a practice application, a user of the control terminal may be in need of controlling the player terminal within the do not disturb time period for some reason. By carrying out the embodiment illustrated in FIG. 4, the control terminal may acquire from the authorized control terminal a permission to control the player terminal within the do not disturb time period. If the authorized control terminal agrees the control terminal to control the player terminal within the do not disturb time period, the control terminal can therefore control the player terminal within the do not disturb time period, thereby preventing the user of the control terminal from missing a great song or show for instance. This improves humanity in controlling the player terminal.

Figure 5:
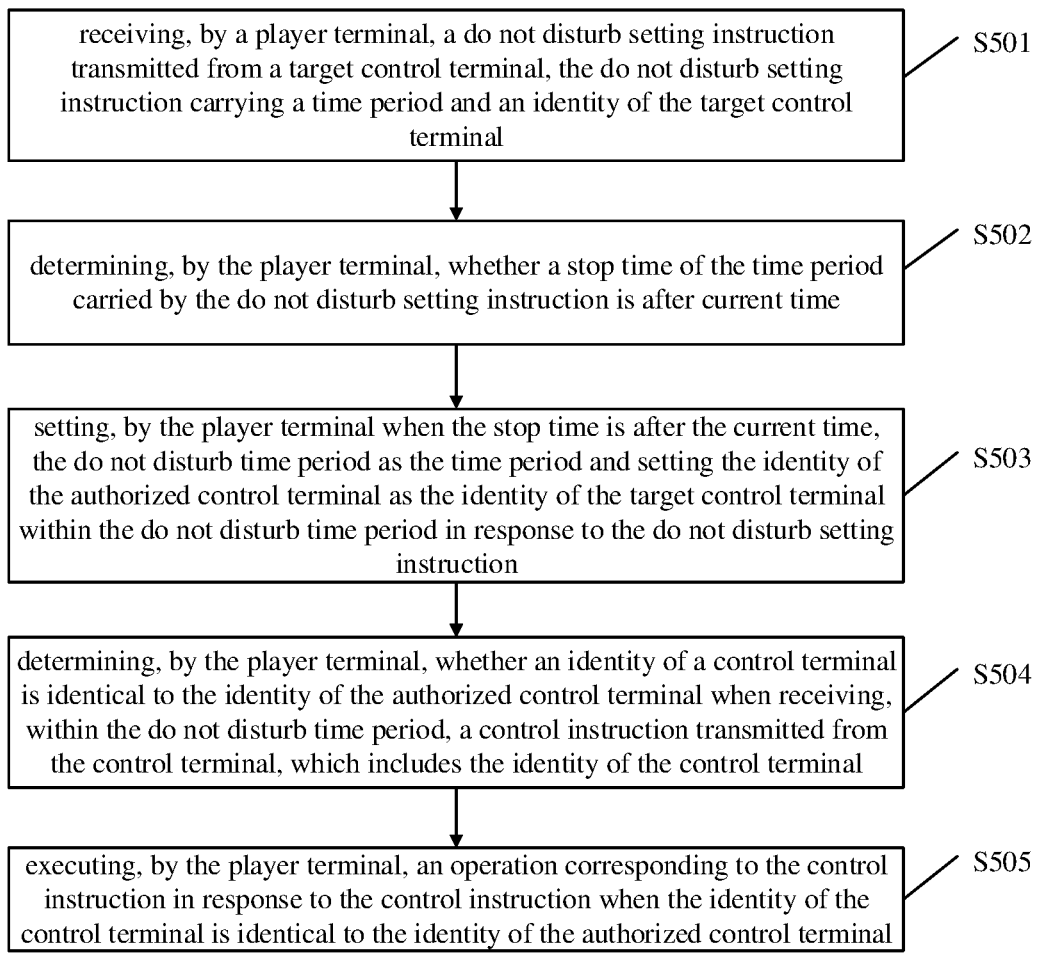
FIG. 5 is a schematic flow chart of another player terminal controlling method disclosed in an embodiment of the present disclosure.

Please refer to FIG. 5, which is a schematic flow chart of another player terminal controlling method disclosed in an embodiment of the present disclosure. As shown in FIG. 5, the player terminal controlling method may begin at block S501.

At block S501, a do not disturb setting instruction transmitted from a target control terminal is received by a player terminal, and the do not disturb setting instruction carries a time period and an identity of the target control terminal.

At block S502, whether a stop time of the time period carried by the do not disturb setting instruction is after current time is determined by the player terminal.

In at least one embodiment of the present disclosure, after the player terminal receives a do not disturb setting instruction transmitted from the target control terminal, the player terminal will determine whether a stop time of the time period carried by the do not disturb setting instruction is after current time. If yes, execute block S503; if no, terminate the process or transmit a prompt message to the target control terminal for indicating that there has an error in inputting the time period.

For example, it is assumed that the current time is at 11:00 and the stop time of the time period carried by the do not disturb setting instruction is at 9:00. Then, the player terminal will determine that the stop time of the time period carried by the do not disturb setting instruction is not after current time, and the player terminal will terminate the process or transmit a prompt message to the target control terminal for indicating that there has an error in inputting the time period. Alternatively, it is assumed that the current time is at 7:00 and the stop time of the time period carried by the do not disturb setting instruction is at 9:00. Then, the player terminal will determine that the stop time of the time period carried by the do not disturb setting instruction is after current time, and the player terminal will execute block S503.

At block S503, when the stop time is after the current time, the do not disturb time period is set by the player terminal as the time period and the identity of the authorized control terminal is set as the identity of the target control terminal within the do not disturb time period in response to the do not disturb setting instruction.

At block S504, whether an identity of a control terminal is identical to the identity of the authorized control terminal is determined by the player terminal when a control instruction transmitted from the control terminal, which includes the identity of the control terminal, is received within the do not disturb time period.

At block S505, an operation corresponding to the control instruction is executed by the player terminal in response to the control instruction when the identity of the control terminal is identical to the identity of the authorized control terminal.

In a practice application, an input error may be occurred in inputting the do not disturb time period by a user of the target control terminal. The user may input a time period already passed. By carrying out the embodiment illustrated in FIG. 5, the error time period can be prevented from taking as the do not disturb time period by the player terminal, thereby improving user experience.

Figure 6:
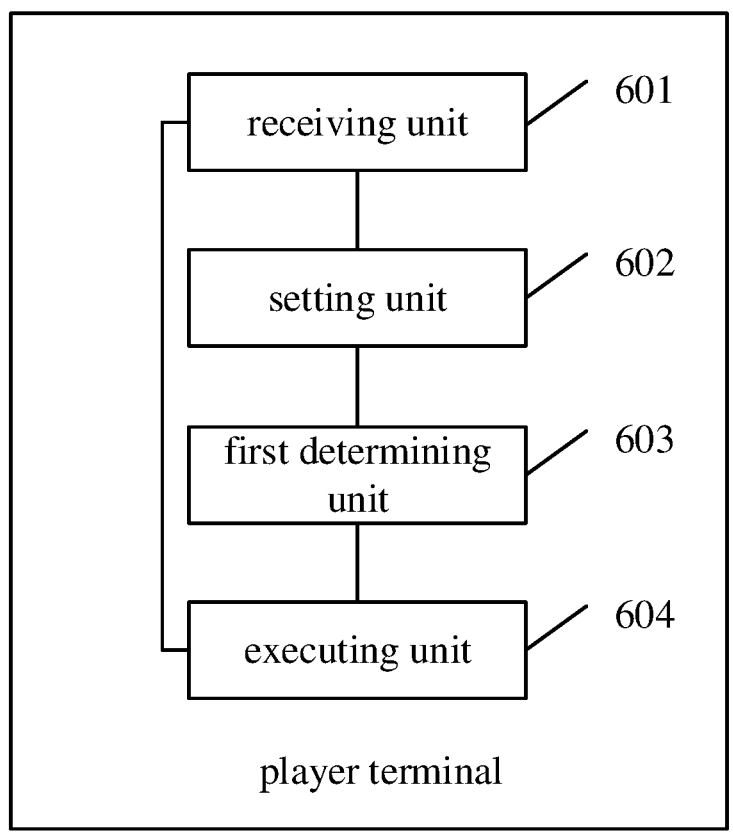
FIG. 6 is a schematic block diagram showing a player terminal disclosed in an embodiment of the present disclosure.

Please refer to FIG. 6, which is a schematic block diagram showing a player terminal disclosed in an embodiment of the present disclosure. The player terminal shown in FIG. 6 may include a receiving unit 601, a setting unit 602, a first determining unit 603, and an executing unit 604, in which: the receiving unit 601 is configured to receive a do not disturb setting instruction transmitted from a target control terminal, the do not disturb setting instruction carrying a time period and an identity of the target control terminal.

In at least one embodiment of the present disclosure, the receiving unit 601 of the player terminal receives a do not disturb setting instruction transmitted from a target control terminal. The do not disturb setting instruction carries a time period and an identity of the target control terminal. The player terminal may include a user terminal having a playing function, such as a smart audio equipment, a smart phone, a smart television, a palmtop computer, a laptop computer, and a desktop computer, but is not limited thereto. The target control terminal may include a user terminal such as a smart phone, a tablet, a laptop computer, and a desktop computer, but is not limited thereto. The operating systems of the player terminal and the target control terminal may include but is not limited to Android Operating System, IOS Operating System, Symbian Operating System, Black Berry Operating System, and WP8 (Windows Phone 8) Operating System, and the embodiment of the present disclosure is not limited thereto.

In at least one embodiment of the present disclosure, a connection is established between the player terminal and the target control terminal before the receiving unit 601 receives the do not disturb setting instruction transmitted from the target control terminal. In at least one embodiment of the present disclosure, a wireless WIFI connection or Bluetooth connection may be established between the player terminal and the target control terminal.

In at least one embodiment of the present disclosure, the identity of the target control terminal is a message that can be used to identify the target control terminal. The identity of the target control terminal may include but is not limited to MAC (Media Access Control) address of the target control terminal.

In at least one embodiment of the present disclosure, the time period carried by the do not disturb setting instruction may be 9:00 to 10:00 or 11:00 to 12:00, for instance.

The setting unit 602 is configured to set a do not disturb time period as the time period and setting an identity of an authorized control terminal as the identity of the target control terminal within the do not disturb time period in response to the do not disturb setting instruction.

The first determining unit 603 is configured to determining whether an identity of a control terminal is identical to the identity of the authorized control terminal when receiving, within the do not disturb time period, a control instruction transmitted from the control terminal, which includes the identity of the control terminal.

In at least one embodiment of the present disclosure, the first determining unit 603 determines whether an identity of a control terminal is identical to the identity of the authorized control terminal within the do not disturb time period when the receiving unit 601 receives, within the do not disturb time period, a control instruction transmitted from the control terminal, which includes the identity of the control terminal. In response to the control instruction, the executing unit 604 executes an operation corresponding to the control instruction if the identity of the control terminal is identical to the identity of the authorized control terminal; in at least one embodiment of the present disclosure, the player terminal prohibits executing the control instruction if they are not identical.

In at least one embodiment of the present disclosure, the control instruction includes a scene control instruction, which is configured to control all the player terminals included in a target scene including one or more player terminals to execute a same target operation. The target operation can be a playing operation, a volume adjusting operation, or a turning-off operation, and the embodiment of the present disclosure is not limited thereto.

For instance, it is assumed that the target scene includes a present player terminal and a player terminal A, and the target operation is to play a predetermined song. Then, the scene control instruction is configured to control both of the present player terminal and the player terminal A to play the predetermined song. When the first determining unit 603 determines that the identity of the control terminal is not identical to the identity of the authorized control terminal within the do not disturb time period, the present player terminal will not execute the target operation corresponding to the scene control instruction. However, the player terminal A is not affected, and will execute, in response to the scene control instruction, the target operation corresponding to the scene control instruction.

The executing unit 604 is utilized configured to execute an operation corresponding to the control instruction in response to the control instruction when the first determining unit 603 determines that the identity of the control terminal is identical to the identity of the authorized control terminal.

In at least one embodiment of the present disclosure, the operation corresponding to the control instruction can be a playing operation or a volume adjusting operation for a predetermined song, and the embodiment of the present disclosure is not limited thereto.

Figure 7:
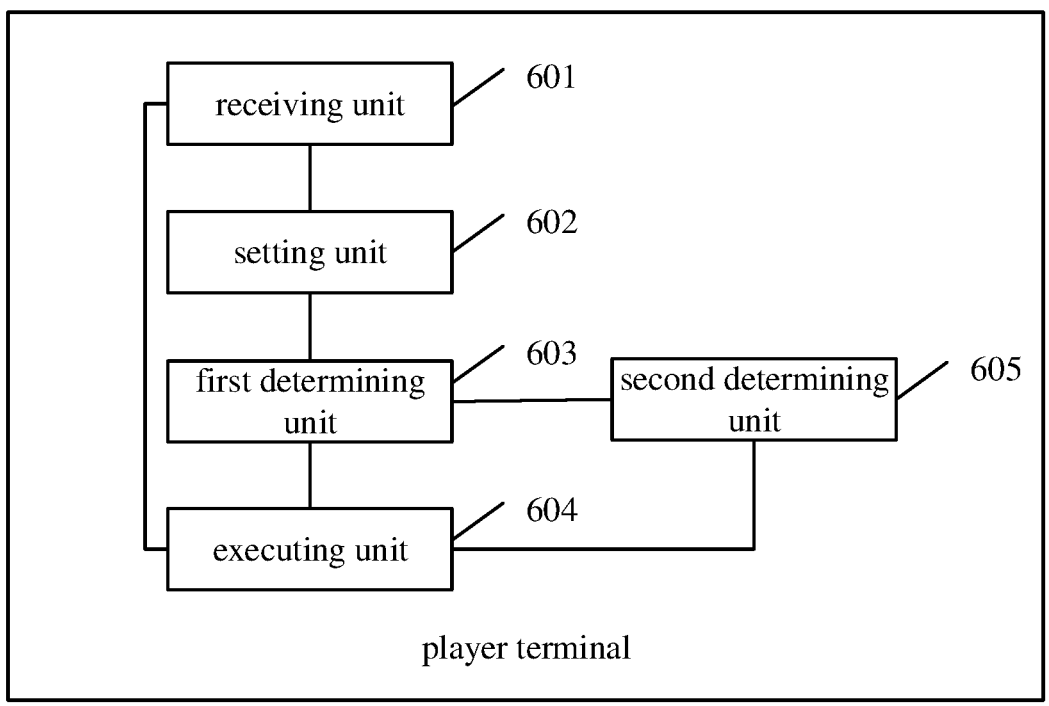
FIG. 7 is a schematic block diagram showing another player terminal disclosed in an embodiment of the present disclosure.

Please also refer to FIG. 7, which is a schematic block diagram showing another player terminal disclosed in an embodiment of the present disclosure. The player terminal shown in FIG. 7 is obtained by optimizing the player terminal shown in FIG. 6. In comparison to the player terminal shown in FIG. 6, the player terminal shown in FIG. 7 may further include a second determining unit 605 in addition to all of the units of the player terminal shown in FIG. 6, in which:

The second determining unit 605 is configured to determine whether execution time of the operation corresponding to the control instruction is within the do not disturb time period when the first determining unit 603 determines that the identity of the control terminal is not identical to the identity of the authorized control terminal.

In at least one embodiment of the present disclosure, the second determining unit 605 determines whether execution time of the operation corresponding to the control instruction is within the do not disturb time period if the first determining unit 603 determines that the identity of the control terminal is not identical to the identity of the authorized control terminal within the do not disturb time period. The executing unit 604 executes the operation corresponding to the control instruction at the execution time if the second determining unit 605 determines that the execution time of the operation corresponding to the control instruction is not within the do not disturb time period. The player terminal prohibits executing the control instruction if the second determining unit 605 determines whether execution time of the operation corresponding to the control instruction is within the do not disturb time period.

In a practice application, the control instruction received by the receiving unit 601 may be an instruction configured to execute a certain operation at a specified time. For example, the receiving unit 601 may receive at 10:00 a control instruction configured to play a predetermined song at 12:00. That is, the execution time of the operation corresponding to the control instruction is 12:00. For instance, it is assumed that the do not disturb time period is between 9:00 and 11:00 and the receiving unit 601 receives at 10:00 a control instruction transmitted from the control terminal, the execution time of which is 12:00. If the first determining unit 603 determines that the identity of the control terminal included in the control instruction is not identical to the identity of the authorized control terminal within the do not disturb time period, the second determining unit 605 determines whether the execution time (i.e., 12:00) of the operation corresponding to the control instruction is within the do not disturb time period (i.e., 9:00 to 11:00). As can be seen, in this case, the execution time (i.e., 12:00) of the operation corresponding to the control instruction is not within the do not disturb time period (i.e., 9:00 to 11:00), and the executing unit 604 will execute the operation corresponding to the control instruction at the execution time.

The executing unit 604 is further configured to execute the operation corresponding to the control instruction at the execution time when the second determining unit 605 determines that the execution time is not within the do not disturb time period.

Figure 8:
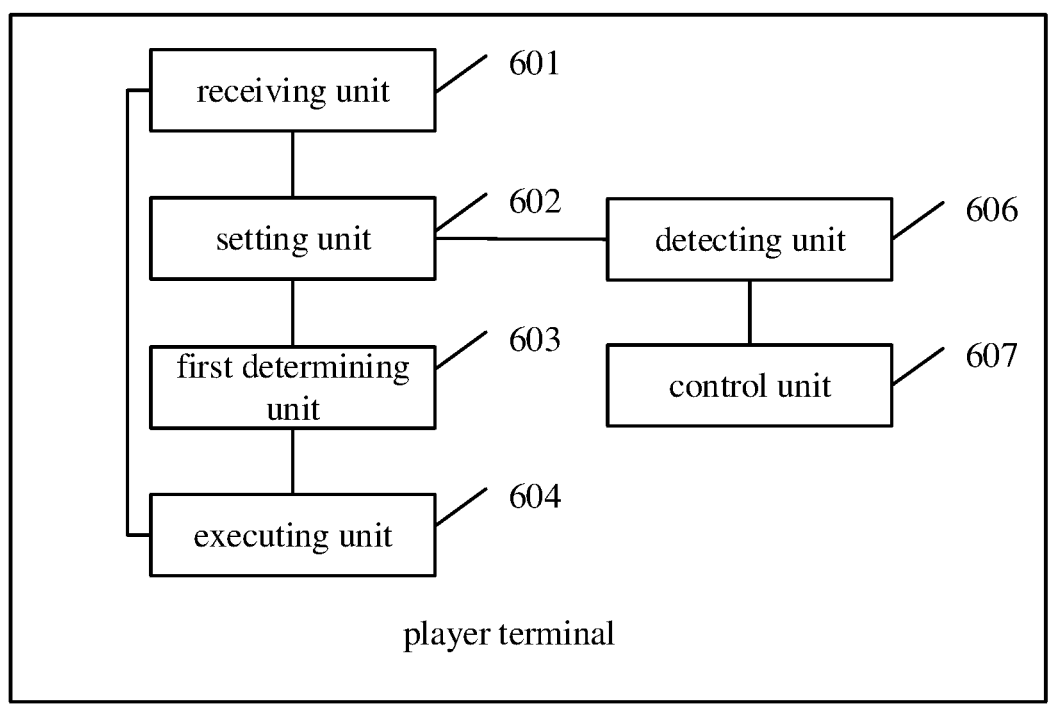
FIG. 8 is a schematic block diagram showing another player terminal disclosed in an embodiment of the present disclosure.

Please also refer to FIG. 8, which is a schematic block diagram showing another player terminal disclosed in an embodiment of the present disclosure. The player terminal shown in FIG. 8 is obtained by optimizing the player terminal shown in FIG. 6. In comparison to the player terminal shown in FIG. 6, the player terminal shown in FIG. 8 may further include a detecting unit 606 and a control unit 607 in addition to all of the units of the player terminal shown in FIG. 6, in which:

The detecting unit 606 is configured to detect, after the setting unit 602 sets the do not disturb time period as the time period and sets the identity of the authorized control terminal as the identity of the target control terminal within the do not disturb time period in response to the do not disturb setting instruction, whether a target control instruction exists, the target control instruction being received before a start time of the do not disturb time period and execution time of an operation corresponding to the target control instruction being within the do not disturb time period.

In at least one embodiment of the present disclosure, after the setting unit 602 sets the do not disturb time period as the time period and sets the identity of the authorized control terminal as the identity of the target control terminal within the do not disturb time period in response to the do not disturb setting instruction, the detecting unit 606 detects whether a target control instruction exists, in which the target control instruction is received before a start time of the do not disturb time period and execution time of an operation corresponding to the target control instruction is within the do not disturb time period. The control terminal 607 prohibits executing the operation corresponding to the target control instruction within the do not disturb time period when the detecting unit 606 detects that there exists the target control instruction; the detecting unit 606 continues to detect whether the target control instruction exists after the start time of the do not disturb time period when the detecting unit 606 detects that there exists no target control instruction. When the stop time of the do not disturb time period is arrived, the detecting unit 606 stops detecting whether the target control instruction exists.

In a practice application, before the start time of the do not disturb time period, the player terminal may receive a control instruction configured to execute a certain operation within the do not disturb time period. For example, it is assumed that the do not disturb time period is between 11:00 and 13:00 and the player terminal receives at 10:00 a control instruction A configured to play a predetermined song at 12:00. That is, the execution time of the operation corresponding to the control instruction A is 12:00. After the setting unit 602 sets the do not disturb time period as 11:00 to 13:00 and sets the identity of the authorized control terminal within 11:00 to 13:00 as the identity of the target control terminal, the detecting unit 606 will detect whether there exists a control instruction having execution time of a corresponding operation within 11:00 to 13:00. In this case, the detecting unit 606 will determine the control instruction A as the target control instruction.

The control unit 607 is configured to prohibit executing the operation corresponding to the target control instruction within the do not disturb time period when the target control instruction is detected by the detecting unit.

Figure 9:
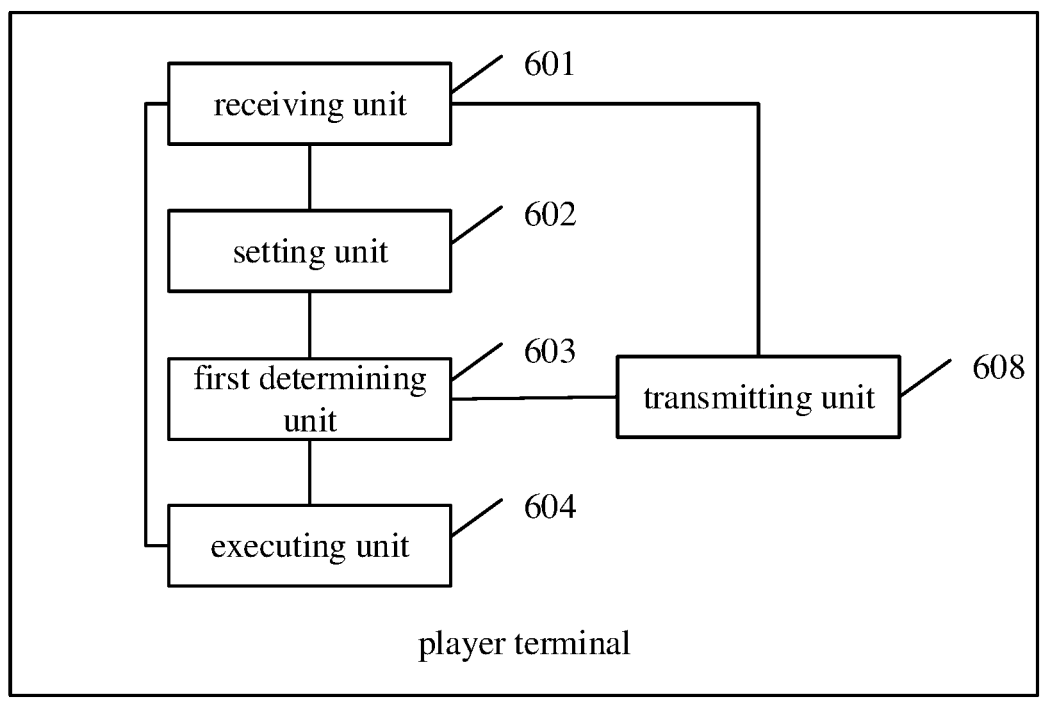
FIG. 9 is a schematic block diagram showing another player terminal disclosed in an embodiment of the present disclosure.

Please also refer to FIG. 9, which is a schematic block diagram showing another player terminal disclosed in an embodiment of the present disclosure. The player terminal shown in FIG. 9 is obtained by optimizing the player terminal shown in FIG. 6. In comparison to the player terminal shown in FIG. 6, the player terminal shown in FIG. 9 may further include a transmitting unit 608 in addition to all of the units of the player terminal shown in FIG. 6, in which:

The transmitting unit 608 is configured to transmit a prompt message to the control terminal for indicating that the player terminal is unavailable within the do not disturb time period when the first determining unit 603 determines that the identity of the control terminal is not identical to the identity of the authorized control terminal.

In at least one embodiment of the present disclosure, after receiving the prompt message, the control terminal will output the prompt message to a user for indicating that the player terminal is unavailable within the do not disturb time period. For instance, it is assumed that the do not disturb time period is between 11:00 and 12:00. The control terminal may output a prompt message to a user for indicating that the player terminal is unavailable within 11:00 to 12:00. If the user still wants to control the player terminal after perceiving the prompt message outputted from the control terminal, the user may click a functional button on the control terminal to trigger the control terminal to transmit a control permission request to the player terminal.

The receiving unit 601 is further configured to receive, after the transmitting unit 608 transmits the prompt message to the control terminal for indicating that the player terminal is unavailable within the do not disturb time period, a control permission request transmitted from the control terminal.

The transmitting unit 608 is further configured to transmit, in response to the control permission request, a prompt message to the authorized control terminal for asking whether to allow the control terminal to control the player terminal within the do not disturb time period.

In at least one embodiment of the present disclosure, after the receiving unit 601 receives the control permission request transmitted from the control terminal, the transmitting unit 608 transmits, in response to the control permission request, a prompt message to the authorized control terminal for asking whether to allow the control terminal to control the player terminal within the do not disturb time period. A user may input, on the authorized control terminal, a control permitted instruction for allowing the control terminal to control the player terminal within the do not disturb time period, or may input, on the authorized control terminal, a control prohibited instruction configured to prohibit the control instruction from controlling the player terminal within the do not disturb time period.

The receiving unit 601 is further configured to receive a control permitted instruction transmitted, in response to the prompt message, from the authorized control terminal.

The setting unit 602 is further configured to set the identity of the authorized control terminal within the do not disturb time period as the identity of the control terminal in response to the control permitted instruction.

Figure 10:
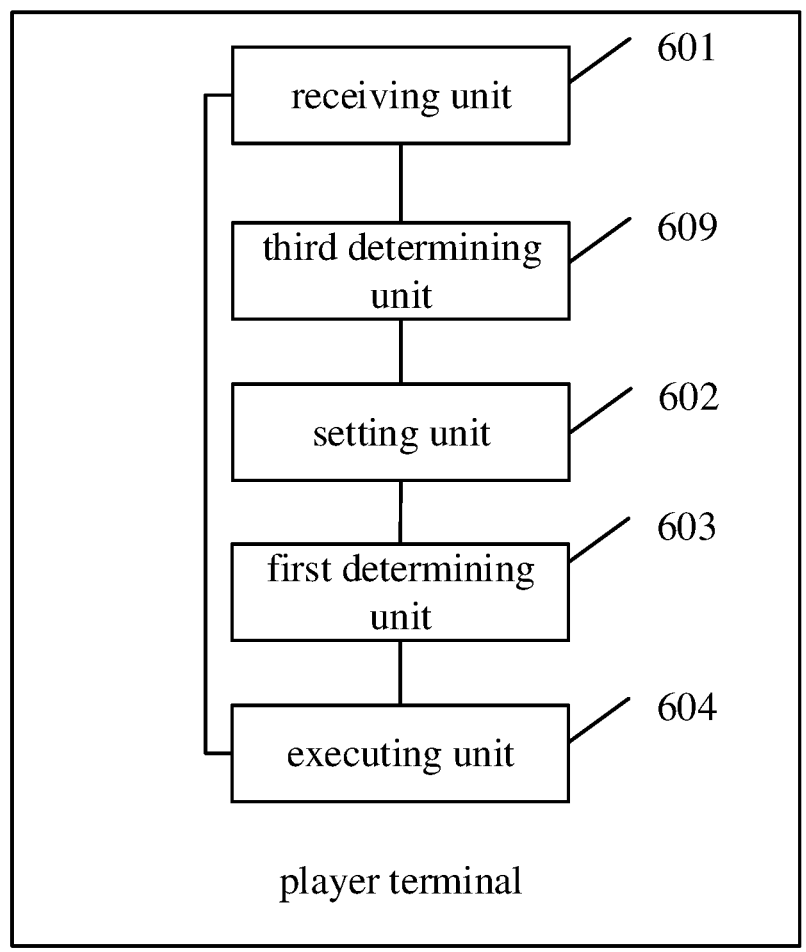
FIG. 10 is a schematic block diagram showing another player terminal disclosed in an embodiment of the present disclosure.

Please also refer to FIG. 10, which is a schematic structural diagram showing another player terminal disclosed in an embodiment of the present disclosure. The player terminal shown in FIG. 10 is obtained by optimizing the player terminal shown in FIG. 6. In comparison to the player terminal shown in FIG. 6, the player terminal shown in FIG. 10 may further include a third determining unit 609 in addition to all of the units of the player terminal shown in FIG. 6, in which:

The third determining unit 609 is configured to determine, after the receiving unit 601 receives the do not disturb setting instruction transmitted from the target control terminal, whether a stop time of the time period carried by the do not disturb setting instruction is after current time.

In at least one embodiment of the present disclosure, it is assumed that the current time is at 11:00 and the stop time of the time period carried by the do not disturb setting instruction is at 9:00, for example. Then, the third determining unit 609 will determine that the stop time of the time period carried by the do not disturb setting instruction is not after the current time, and the player terminal will terminate the process or transmit a prompt message to the target control terminal for indicating that there has an error in inputting the time period. Alternatively, it is assumed that the current time is at 7:00 and the stop time of the time period carried by the do not disturb setting instruction is at 9:00. Then, the third determining unit 609 will determine that the stop time of the time period carried by the do not disturb setting instruction is after the current time, and the setting unit 602 will set the do not disturb time period as the time period carried by the do not disturb setting instruction and sets the identity of the authorized control terminal as the identity of the target control terminal within the do not disturb time period in response to the do not disturb setting instruction.

When the third determining unit 609 determines that the stop time is after the current time, the setting unit 602 is triggered to set the do not disturb time period as the time period and set the identity of the authorized control terminal as the identity of the target control terminal within the do not disturb time period in response to the do not disturb setting instruction.

In the player terminals illustrated in FIGS. 6 to 10, after the receiving unit 601 receives a do not disturb setting instruction transmitted from a target control terminal, the setting unit 602 sets a do not disturb time period as a time period carried by the do not disturb setting instruction and sets an identity of an authorized control terminal within the do not disturb time period as an identity of the target control terminal carried by the do not disturb setting instruction, in response to the do not disturb setting instruction; the first determining unit 603 determines whether an identity of a control terminal is identical to the identity of the authorized control terminal when receiving, within the do not disturb time period, a control instruction transmitted from the control terminal, which includes the identity of the control terminal; the player terminal executes an operation corresponding to the control instruction in response to the control instruction when the identity of the control terminal is identical to the identity of the authorized control terminal. As can be seen, carrying out the embodiment of the present disclosure can make the player terminal be controlled only by a specified user terminal within a specific time period. This increases the ability of a user terminal to take exclusive control of the player terminal at the specific time period.

In order to carry out above embodiments, the present disclosure further provides a player terminal, which includes one or more processors, a storage, and one or more units. Said one or more units are stored in the storage and perform the following operations of the method of FIG. 1 when executed by said one or more processors:

At block S101, a do not disturb setting instruction transmitted from a target control terminal is received, and the do not disturb setting instruction carries a time period and an identity of the target control terminal.

At block S102, a do not disturb time period is set as the time period and an identity of an authorized control terminal is set as the identity of the target control terminal within the do not disturb time period in response to the do not disturb setting instruction.

At block S103, whether an identity of a control terminal is identical to the identity of the authorized control terminal is determined when a control instruction transmitted from the control terminal, which includes the identity of the control terminal, is received within the do not disturb time period.

At block S104, an operation corresponding to the control instruction is executed in response to the control instruction when the identity of the control terminal is identical to the identity of the authorized control terminal.

In order to carry out above embodiments, the present disclosure further provides a storage medium configured to store an application program, which is configured to execute the player terminal controlling method according any one of the afore-described embodiments of the present disclosure.

The blocks of the method of the embodiments of the present disclosure can be adjusted in order, combined, and eliminated according to the actual needs.

The units of the player terminal of the embodiments of the present disclosure can be combined, split, or eliminated according to the actual need.

A person of ordinary skill in the art can realize that part or whole of the blocks in the methods according to the above embodiments may be implemented by a program instructing relevant hardware of a terminal apparatus. The program may be stored in a computer readable storage medium. The storage medium may include a flash disk, a Read-Only Memory (ROM), a Random Access Memory (RAM), a magnetic disk, or an optical disk, et al.

The player terminal controlling method and the player terminal disclosed in the embodiments of the present disclosure have been described in detail above. The principle and implementation of the present disclosure are described herein through specific examples. The description about the embodiments of the present disclosure is merely provided for ease of understanding the method and core ideas of the present disclosure. A person of ordinary skill in the art can make changes to the present disclosure in terms of the specific implementations and application scopes according to the ideas of the present disclosure. Therefore, the specification shall not be construed as a limit to the present disclosure.

What is claimed is:

1. A player terminal controlling method to control an operation of the player terminal by a target control terminal, comprising:
receiving, by the player terminal, a do not disturb setting instruction transmitted from the target control terminal, the do not disturb setting instruction carrying a time period and an identity of the target control terminal;
setting a do not disturb time period as the time period and setting an identity of an authorized control terminal as the identity of the target control terminal within the do not disturb time period in response to the do not disturb setting instruction;
determining whether an identity of a control terminal is identical to the identity of the authorized control terminal when receiving, within the do not disturb time period, a control instruction transmitted from the control terminal, which includes the identity of the control terminal; and
executing an operation corresponding to the control instruction in response to the control instruction when the identity of the control terminal is identical to the identity of the authorized control terminal.

2. The method according to claim 1, further comprising:
determining whether execution time of the operation corresponding to the control instruction is within the do not disturb time period when the identity of the control terminal is not identical to the identity of the authorized control terminal; and
executing the operation corresponding to the control instruction at the execution time if the execution time is not within the do not disturb time period.

3. The method according to claim 1, wherein after setting the do not disturb time period as the time period and setting the identity of the authorized control terminal as the identity of the target control terminal within the do not disturb time period in response to the do not disturb setting instruction, the method further comprises:
detecting whether a target control instruction exists, the target control instruction being received before a start time of the do not disturb time period and execution time of an operation corresponding to the target control instruction being within the do not disturb time period; and
prohibiting executing the operation corresponding to the target control instruction within the do not disturb time period if the target control instruction exists.

4. The method according to claim 1, further comprising:
transmitting a prompt message to the control terminal for indicating that the player terminal is unavailable within the do not disturb time period when the identity of the control terminal is not identical to the identity of the authorized control terminal.

5. The method according to claim 4, wherein after transmitting the prompt message to the control terminal for indicating that the player terminal is unavailable within the do not disturb time period when the identity of the control terminal is not identical to the identity of the authorized control terminal, the method further comprises:
receiving a control permission request transmitted from the control terminal;
transmitting, in response to the control permission request, a prompt message to the authorized control terminal for asking whether to allow the control terminal to control the player terminal within the do not disturb time period;
receiving a control permitted instruction transmitted, in response to the prompt message, from the authorized control terminal; and
setting the identity of the authorized control terminal within the do not disturb time period as the identity of the control terminal in response to the control permitted instruction.

6. The method according to claim 1, wherein the control instruction comprises a scene control instruction, which is configured to control all the player terminals included in a target scene to execute a same target operation, the target scene comprising one or more player terminals.

7. The method according to claim 1, wherein after receiving the do not disturb setting instruction transmitted from the target control terminal, the method further comprises:
determining whether a stop time of the time period carried by the do not disturb setting instruction is after current time; and
executing, when the stop time is after the current time, setting the do not disturb time period as the time period and setting the identity of the authorized control terminal as the identity of the target control terminal within the do not disturb time period in response to the do not disturb setting instruction.

8. A player terminal, comprising:
a receiving unit configured to receive a do not disturb setting instruction transmitted from a target control terminal, the do not disturb setting instruction carrying a time period and an identity of the target control terminal;
a setting unit configured to set a do not disturb time period as the time period and setting an identity of an authorized control terminal as the identity of the target control terminal within the do not disturb time period in response to the do not disturb setting instruction;
a first determining unit configured to determine whether an identity of a control terminal is identical to the identity of the authorized control terminal when receiving, within the do not disturb time period, a control instruction transmitted from the control terminal, which includes the identity of the control terminal; and
an executing unit configured to execute an operation corresponding to the control instruction in response to the control instruction when the first determining unit determines that the identity of the control terminal is identical to the identity of the authorized control terminal.

9. The player terminal according to claim 8, further comprising:
a second determining unit configured to determine whether execution time of the operation corresponding to the control instruction is within the do not disturb time period when the first determining unit determines that the identity of the control terminal is not identical to the identity of the authorized control terminal; and
the executing unit further configured to execute the operation corresponding to the control instruction at the execution time when the second determining unit determines that the execution time is not within the do not disturb time period.

10. The player terminal according to claim 8, further comprising:
a detecting unit configured to detect, after setting the do not disturb time period as the time period and setting the identity of the authorized control terminal as the identity of the target control terminal within the do not disturb time period in response to the do not disturb setting instruction, whether a target control instruction exists, the target control instruction being received before a start time of the do not disturb time period and execution time of an operation corresponding to the target control instruction being within the do not disturb time period; and
a control unit configured to prohibit executing the operation corresponding to the target control instruction within the do not disturb time period when the target control instruction is detected by the detecting unit.

11. The player terminal according to claim 8, further comprising:
a transmitting unit configured to transmit a prompt message to the control terminal for indicating that the player terminal is unavailable within the do not disturb time period when the first determining unit determines that the identity of the control terminal is not identical to the identity of the authorized control terminal.

12. The player terminal according to claim 11, wherein:
the receiving unit further configured to receive, after the transmitting unit transmits the prompt message to the control terminal for indicating that the player terminal is unavailable within the do not disturb time period, a control permission request transmitted from the control terminal;
the transmitting unit further configured to transmit, in response to the control permission request, a prompt message to the authorized control terminal for asking whether to allow the control terminal to control the player terminal within the do not disturb time period;
the receiving unit further configured to receive a control permitted instruction transmitted, in response to the prompt message, from the authorized control terminal; and
the setting unit further configured to set the identity of the authorized control terminal within the do not disturb time period as the identity of the control terminal in response to the control permitted instruction.

13. The player terminal according to claim 8, wherein the control instruction comprises a scene control instruction, which is configured to control all the player terminals included in a target scene to execute a same target operation, the target scene comprising one or more player terminals.

14. The player terminal according to claim 8, further comprising:
a third determining unit configured to determine, after the receiving unit receives the do not disturb setting instruction transmitted from the target control terminal, whether a stop time of the time period carried by the do not disturb setting instruction is after current time; and
the setting unit being triggered, when the third determining unit determines that the stop time is after the current time, to execute setting the do not disturb time period as the time period and setting the identity of the authorized control terminal as the identity of the target control terminal within the do not disturb time period in response to the do not disturb setting instruction.

15. A player terminal, comprising:
one or more processors;
a storage;
one or more units, said one or more units being stored in the storage and performing the following operations when executed by said one or more processors:
receiving a do not disturb setting instruction transmitted from a target control terminal, the do not disturb setting instruction carrying a time period and an identity of the target control terminal;
setting a do not disturb time period as the time period and setting an identity of an authorized control terminal as the identity of the target control terminal within the do not disturb time period in response to the do not disturb setting instruction;
determining whether an identity of a control terminal is identical to the identity of the authorized control terminal when receiving, within the do not disturb time period, a control instruction transmitted from the control terminal, which includes the identity of the control terminal; and
executing an operation corresponding to the control instruction in response to the control instruction when the identity of the control terminal is identical to the identity of the authorized control terminal.

16. The player terminal according to claim 15, wherein said one or more units further perform the following operations:

determining whether execution time of the operation corresponding to the control instruction is within the do not disturb time period when the identity of the control terminal is not identical to the identity of the authorized control terminal; and executing the operation corresponding to the control instruction at the execution time if the execution time is not within the do not disturb time period.

17. The player terminal according to claim 15, wherein after setting the do not disturb time period as the time period and setting the identity of the authorized control terminal as the identity of the target control terminal within the do not disturb time period in response to the do not disturb setting instruction, said one or more units further perform the following operations:

detecting whether a target control instruction exists, the target control instruction being received before a start time of the do not disturb time period and execution time of an operation corresponding to the target control instruction being within the do not disturb time period; and prohibiting executing the operation corresponding to the target control instruction within the do not disturb time period if the target control instruction exists.

18. The player terminal according to any one of claim 15, wherein said one or more units further perform the following operation:

transmitting a prompt message to the control terminal for indicating that the player terminal is unavailable within the do not disturb time period when the identity of the control terminal is not identical to the identity of the authorized control terminal.

19. The player terminal according to claim 18, wherein after transmitting the prompt message to the control terminal for indicating that the player terminal is unavailable within the do not disturb time period when the identity of the control terminal is not identical to the identity of the authorized control terminal, said one or more units further perform the following operations:

receiving a control permission request transmitted from the control terminal;

transmitting, in response to the control permission request, a prompt message to the authorized control terminal for asking whether to allow the control terminal to control the player terminal within the do not disturb time period;

receiving a control permitted instruction transmitted, in response to the prompt message, from the authorized control terminal; and setting the identity of the authorized control terminal within the do not disturb time period as the identity of the control terminal in response to the control permitted instruction.

20. The player terminal according to claim 15, wherein after receiving the do not disturb setting instruction transmitted from the target control terminal, said one or more units further perform the following operations:

determining whether a stop time of the time period carried by the do not disturb setting instruction is after current time; and executing, when the stop time is after the current time, setting the do not disturb time period as the time period and setting the identity of the authorized control terminal as the identity of the target control terminal within the do not disturb time period in response to the do not disturb setting instruction.

\* \* \* \* \*